Oct. 29, 1968 C. L. CLEVENGER ET AL 3,407,491
MOLDED COMMUTATOR
Filed Oct. 23, 1965 5 Sheets-Sheet 1

INVENTORS
Carl L. Clevenger
Edward B. Hughel
Loren W. Miller
BY C. R. Meland
Their Attorney

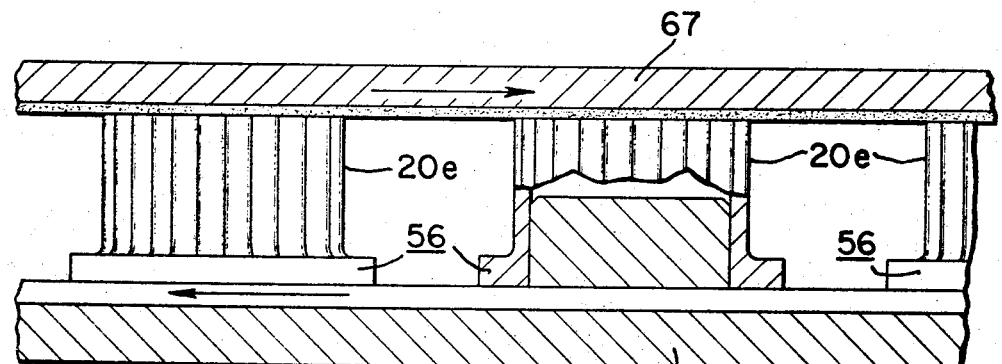
Fig. 6
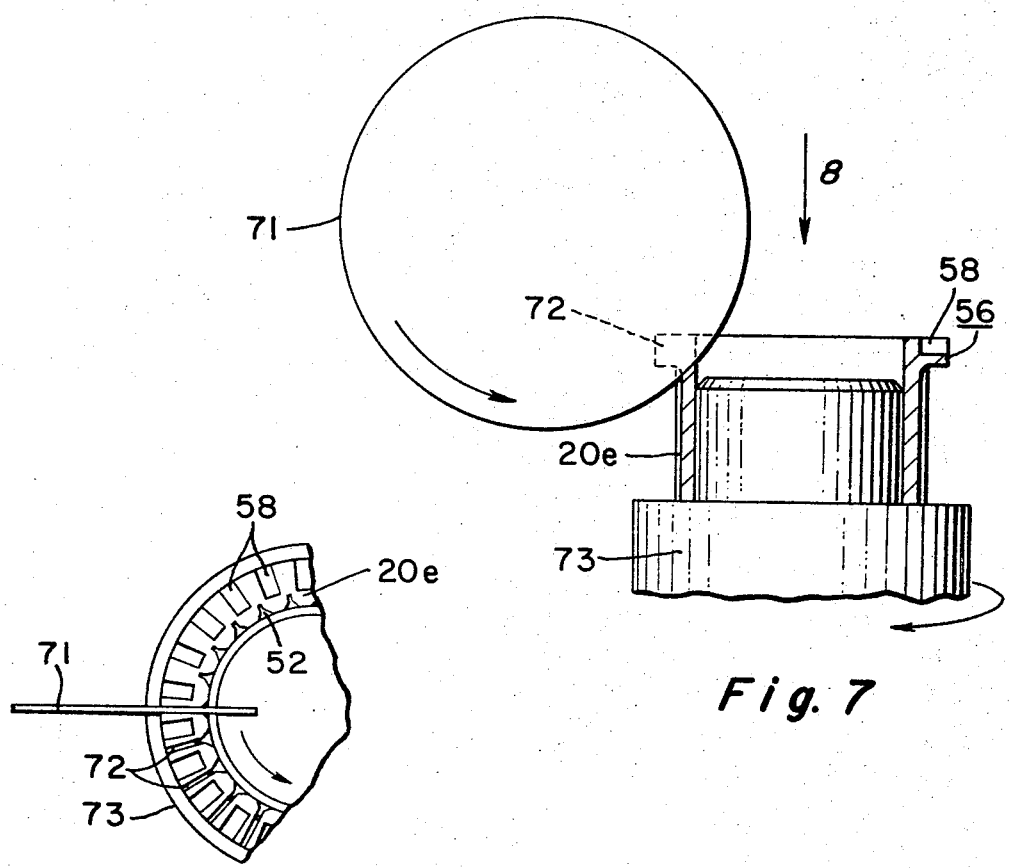
Fig. 7
Fig. 8

Oct. 29, 1968    C. L. CLEVENGER ET AL    3,407,491
MOLDED COMMUTATOR

Filed Oct. 23, 1965    5 Sheets-Sheet 4

INVENTORS
Carl L. Clevenger
Edward B. Hughel
Loren W. Miller
BY C.R. Meland
Their Attorney Oct. 29, 1968   C. L. CLEVENGER ET AL   3,407,491
MOLDED COMMUTATOR
Filed Oct. 23, 1965

INVENTORS
Carl L. Clevenger
Edward B. Hughel
Loren W. Miller
BY C. R. Meland
Their Attorney 3,407,491
MOLDED COMMUTATOR
Carl L. Clevenger and Edward B. Hughel, Anderson, and Loren W. Miller, Daleville, Ind., assignors to General Motors Corporation, Detroit, Mich., a corporation of Delaware
Filed Oct. 23, 1965, Ser. No. 504,031
5 Claims. (Cl. 29—597)

ABSTRACT OF THE DISCLOSURE

This invention relates to a method of manufacturing a commutator having a molded hub formed of insulating material. In performing the method an annular piece of copper material is provided which is extruded to form a commutator section and a riser section. During the extrusion the commutator section is provided with radially extending ribs defining slots which face the inside of the commutator section. After the extruded part is formed a plurality of slots are formed in the riser section by a sawing operation and these slots are aligned with the longitudinally extending slots. A quantity of insulating material is molded to the interior of the extruded part and is molded such that the insulating material fills the slots in the commutator section and the slots sawed in the riser section. After the insulating material has been molded to the extruded part the ribs are machined off to provide commutator and riser sections that are insulated from each other.

---

This invention relates to a molded commutator and more particularly to a method of manufacturing a molded commutator for dynamoelectric machines.

It is known in the commutator art to manufacture a molded commutator by molding a quantity of plastic material to a cylindrical shell of electrically conducting metal material such as copper and then cutting the metal shell to form commutator segments.

In fabricating molded commutators, the commutator segments have been formed by sawing longitudinal slots in the metal cylinder, the material between the slots forming the commutator segments.

In contrast to molded commutators which are formed by sawing longitudinal slots, it is an object of this invention to provide a method of manufacturing a commutator where the commutator segments can be formed by rotating the commutator relative to a cutting tool so that the cuting tool is capable of removing selected areas of metal material to form commutator segments between the areas where the material has been removed. In performing this method, an extruded one-piece tubular sleeve of copper material is provided which has outwardly directed ribs forming inner longitudinally extending passages or slots that receive a plastic moldable material. This plastic material fills the slots formed by the outwardly directed ribs and when the ribs are machined such as by a turning operation, the commutator segments are formed due to the fact that the ribs have been machined off leaving segments of the metal sleeve separated by the plastic material located in the slots formed by the outwardly directed ribs.

Another object of this invention is to provide a method of manufacturing a molded commutator where the tubular sleeve of metal material is formed by an extrusion operation which is operative to form the outwardly directed ribs and which is also operative to form spaced recesses in a flanged portion of the sleeve which forms risers for the commutator.

A further object of this invention is to provide a method of manufacturing a molded commutator which has risers that can be connected with conductors of an armature.

Further objects and advantages of the present invention will be apparent from the following description, reference being had to the accompanying drawings wherein preferred embodiments of the present invention are clearly shown.

In the drawings:

FIGURE 6 illustrates a method of removing burrs from the tubular commutator parts after they have been extruded.

FIGURE 7 illustrates a sawing operation which is performed on the extruded tubular part.

FIGURE 8 is a view of the sawing operation looking in the direction of the arrow 8 in FIGURE 7.

Figure 1:
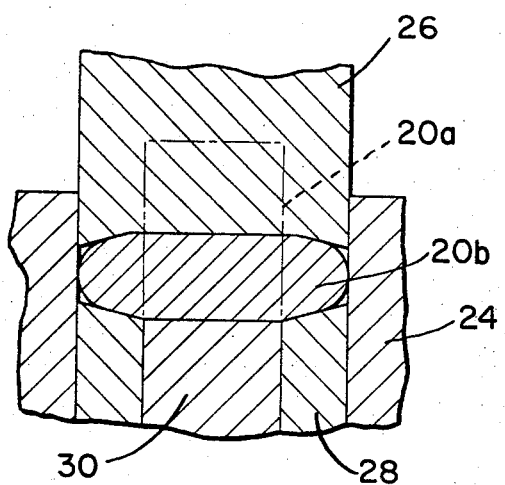
FIGURES 1 through 3 illustrate the initial steps of forming a slug of copper material which is to be extruded into a tubular shape.
Figure 2:
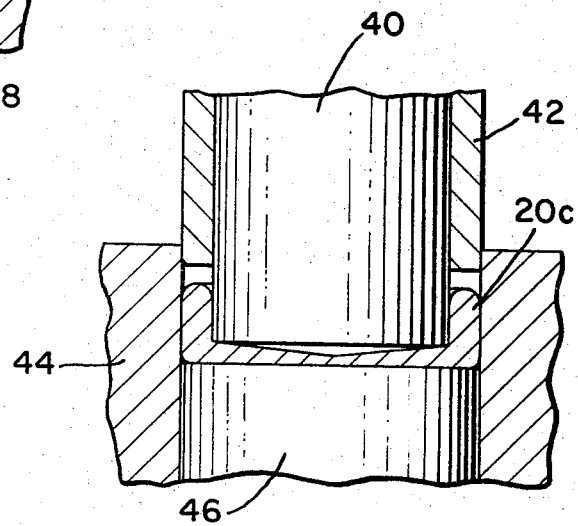
Figure 3:
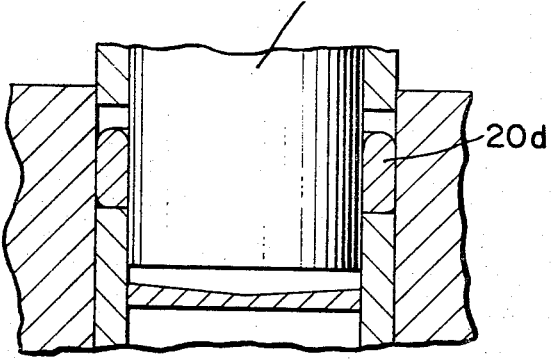

The initial operations for manufacturing the commutator of this invention are illustrated in FIGURES 1 through 3. Since the method of manufacture involves a number of forming steps performed on one slug of copper material, this material is designated by reference numeral 20 in the following description of the method of manufacture followed by a letter to indicate the sequence of operations. A blank of copper material is provided by cutting off a portion 20a of a length of bar stock copper material and this blank is upset to form the part 20b illustrated in FIGURE 1. This upsetting operation is performed by the die 24 and punches 26, 28 and 30.

After the upsetting operation, the part 20b is formed to the shape 20c shown in FIGURE 2 where the copper material is generally cup-shaped. In FIGURE 2, the forming operation is accomplished by a punch 40, a sleeve 42, a die part 44 and a punch 46.

Following the forming operation which is illustrated in FIGURE 2, the part 20c is pierced as shown in FIGURE 3 by the punch 48 to form the annular slug of material 20d illustrated in FIGURE 3.

Figure 4:
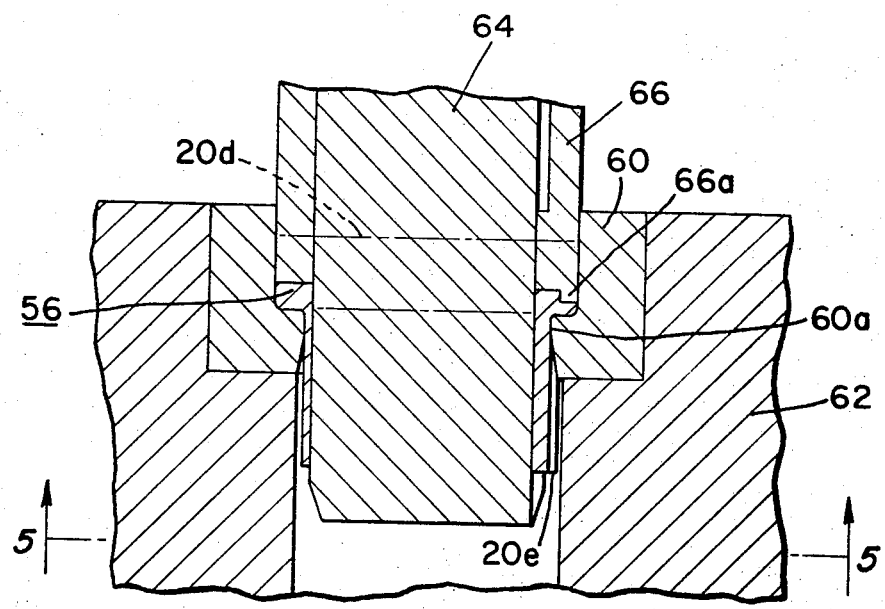
FIGURE 4 illustrates the method of extruding a slug of copper material to form the tubular sleeve.
Figure 5:
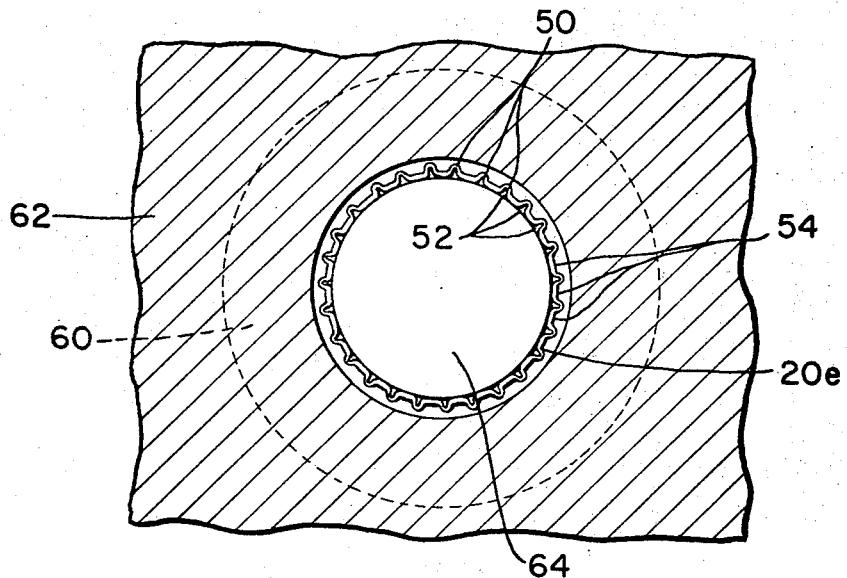
FIGURE 5 is a sectional view taken along line 5—5 of FIGURE 4.

After the annular slug of copper material 20d has been formed as shown in FIGURE 3, this slug of material is extruded to form a tubular part 20e which is illustrated in FIGURES 4 and 5. This tubular part 20e has a plurality of outwardly directed ribs 50 which encompass the longitudinally extending slots 52. The sections of material 54 are positioned between the outwardly directed ribs 50 and connect these ribs as is readily apparent from an inspection of FIGURE 5. The sections 54 will ultimately form the commutator segments for the commutator when the ribs 50 are machined away so that the segments 54 are separated by the slots 52. In this regard, it is noted that the outer face of the sections 54 are at about the same radial distance as the inner wall of ribs 50 so that when the ribs 50 are machined away, the slots 52 separate the commutator segments 54. In this regard, very little or no machining of the segments 54 is required in order to separate these segments by a machining of the ribs 50. The only machining that is required is that to remove the material forming the ribs 50 and to smooth the surface of the commutator segments 54.

The sleeve shown in FIGURES 4, 6 and 7 has an annular riser section generally designated by reference numeral 56 which is formed with recesses 58 that eventually are pierced to form connector slots that receive armature conductors. The recesses 58 are formed during the extrusion step illustrated in FIGURE 4 and are located in alignment with the sections 54 of the extruded tubular part 20.

The apparatus for performing the extruding step which is illustrated in FIGURE 4, includes the die parts 60 and 62 and the punches 64 and 66. The annular slug of material 20d shown in FIGURE 3 is positioned within the die part 60 and as the punches 64 and 60 move downwardly, this annular slug of material is extruded to the shape 20e shown in FIGURES 4 and 5. The punch 64 has an outer configuration which conforms to the inner configuration of the tubular part shown in FIGURE 5 and the die part 60 has a portion 60a conforming to the outer configuration of the tubular part. The punch 66 has projecting teeth 66a which form the recesses 58 in the flanged riser portion 56 of the tubular commutator part.

Following the extrusion step illustrated in FIGURE 4 and after the tubular part 20e has been formed as shown in FIGURES 4 and 5, the end face of the tubular part 20e opposite the riser section end is faced by the operation shown in FIGURE 6. This can be accomplished in a number of ways, one of which, as shown in FIGURE 6, is to pass a sanding belt 67 of abrasive material over the end face of the tubular parts 20e to make a smooth finished end on this part. The parts are mounted on a movable support 69.

After the end of the tubular part has been faced, a plurality of slots 72 are sawed in the riser end of the tubular part 20e as shown in FIGURES 7 and 8. These slots are sawed by the saw 71 as the part 20 is indexed and the slots 72 are located in alignment with the slots 52 and only extend through the riser section 56 of the tubular commutator part 20. These slots as noted above are formed by a sawing operation as the tubular commutator part is indexed rotatably by the support 73 during the sawing operation.

Figure 9:
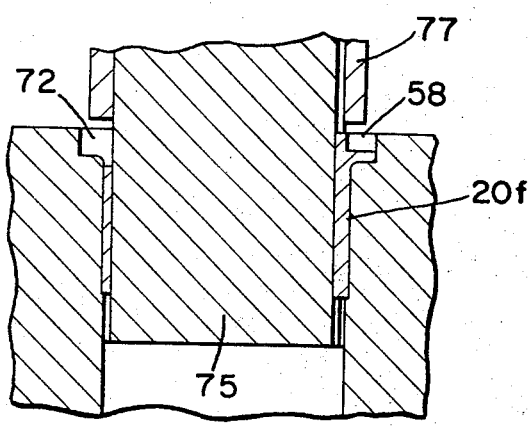
FIGURE 9 illustrates an operation for removing the burrs following the sawing operation.

After the slots 72 have been sawed in the riser section of the tubular commutator part, the burrs are removed by an operation shown in FIGURE 9 employing a broach 75 and stripper 77.

Figure 10:
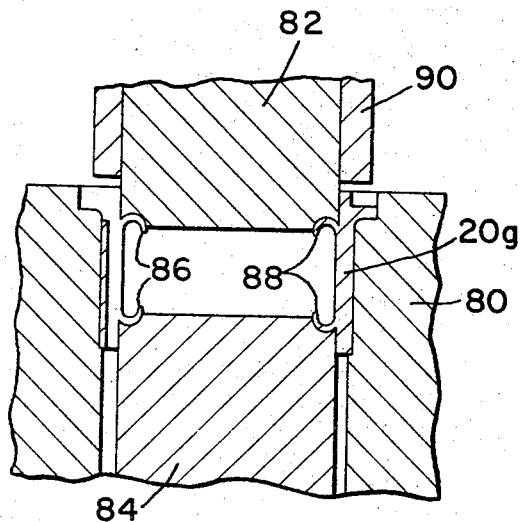
FIGURE 10 illustrates a method of forming anchors in the tubular sleeve.

After removal of the burrs, the tubular commutator part 20f is placed in a die 80 which is shown in FIGURE 10 and a pair of punches 82 and 84 are advanced to form the anchors 86 and 88. The port then takes the form 20g shown in FIGURE 10. These anchors are aligned with the commutator sections 54 and located between the ribs 50. The apparatus of FIGURE 10 includes the stripper 90.

Figure 11:
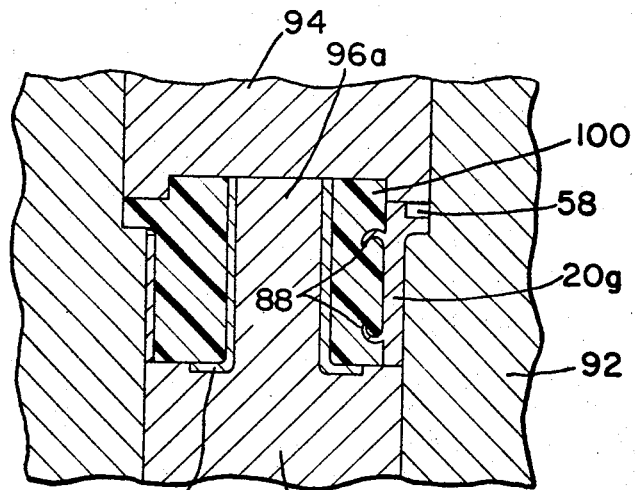
FIGURE 11 illustrates apparatus for molding plastic material between a tubular inner sleeve and the extruded outer sleeve.
Figure 13:
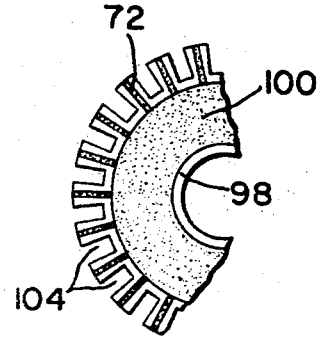
FIGURE 13 is a view taken along line 13—13 of FIGURE 12.
Figure 14:
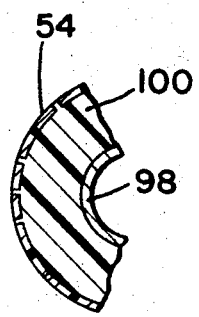
FIGURE 14 is a sectional view taken along line 14—14 of FIGURE 12.

After the anchors 86 and 88 have been formed, the tubular commutator part 20g is placed in a mold as shown in FIGURE 11 which is comprised of parts 92, 94 and 96. The part 96 has a pilot section 96a which supports a metal sleeve 98 that forms the inner part of the finished commutator that is carried by the armature shaft. A quantity of plastic material 100 is injected into the cavity formed by the mold parts and this plastic material fills the grooves or slots 52 as well as the sawed slots 72 formed in the riser section of the tubular commutator part. This filling of the sawed slots and the slots 52 is illustrated in FIGURES 13 and 14.

Figure 12:
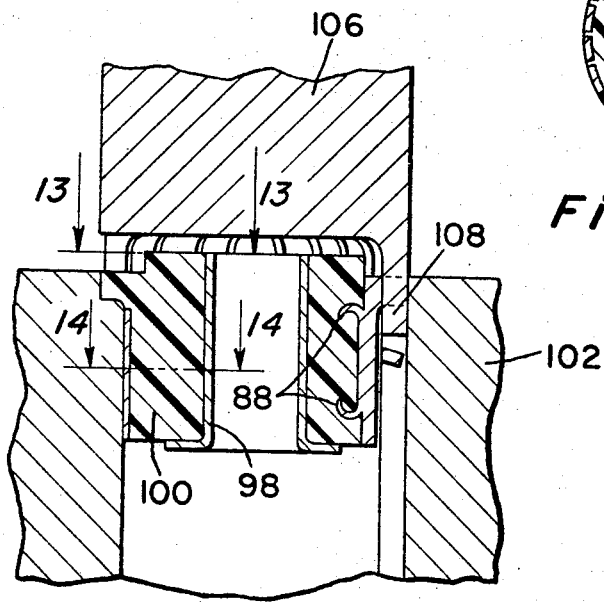
FIGURE 12 illustrates a method of piercing the connector slots for the commutator of this invention.

After the plastic material has been molded to the inner sleeve 98 and the outer tubular commutator part, the part is placed in a die 102 shown in FIGURE 12 and the slots 104 are formed by a piercing operation. A punch 106 is used for this piercing operation having teeth 108 which punch out the material of the riser section of the sleeve at the recesses 58 formed by the extrusion step of FIGURE 4. The material punched was reduced in depth by the extrusion step and is therefore readily accomplished during the piercing step of FIGURE 12.

After the piercing operation of FIGURE 12, the outer surface of the tubular part is machined to remove the material that forms the ribs 50 and to also form the smooth surface on the sections 54. This machining can be performed on a lathe where the part is rotated relative to the tool and is called a turning operation. The surface of the flanged section 56 is also machined to remove any burrs formed during the piercing operation and the commutator is now ready to be assembled to a shaft with the slots 104 receiving the armature conductors. The armature conductors can be soldered in the slots formed in the riser section of the sleeve.

While the embodiments of the present invention as herein disclosed constitute a preferred form, it is to be understood that other forms might be adopted.

What is claimed is as follows:

1. A method of manufacturing a commutator for a dynamoelectric machine which has an annular commutator section and a radially extending riser section, the steps comprising, extruding a quantity of metal material to form a tubular commutator section and substantially simultaneously forming a radially extending riser section, said tubular commutator section being formed during said extrusion with a plurality of circumferentially spaced and outwardly directed ribs which circumscribe longitudinally extending slots facing the interior of said tubular commutator section, said riser section being provided with a plurality of recesses substantially simultaneously with said extrusion, cutting said riser section to form slots that are aligned with and join said longitudinally extending slots, molding a quantity of plastic material to the interior of said commutator section and riser section with said plastic material filling said longitudinally extending slots of said commutator section and said slots cut in said riser section, and then machining the outer circumference of said commutator section to remove said ribs and form commutator segments.

2. A method of manufacturing a commutator, the steps comprising, providing a length of electrically conductive material, progressively cutting off sections of said metal material, upsetting each section of metal material, forming said upset section of metal material into a generally cup-shaped piece, piercing said cup-shaped piece to form an annular section of metal material, extruding said annular piece of said metal material to form a tubular part having a commutator section being formed with a plurality of radially outwardly extending ribs defining longitudinally extending slots that face the interior of said commutator section during said extrusion, and a riser section which is formed substantially simultaneously with said extrusion, said riser section being provided with a plurality of circumferentially spaced recesses substantially simultaneously with extrusion, cutting a plurality of slots in said riser section that are aligned with said longitudinally extending slots, forming a plurality of anchors from the material of said commutator section that is located between said longitudinally extending slots, molding a quanity of insulating material to the interior of said commutator section and filling the slots in said commutator section and the slots in said riser section with said insulating material, machining the exterior of said commutator section to remove said radially extending ribs and provide a plurality of separated commutator sections joined to riser sections, and then piercing said riser sections over the areas defined by said recesses to provide a plurality of slots in said riser sections that are to receive armature conductors.

3. The method of manufacture according to claim 2 where a tubular part is provided when said plastic material is molded to the interior of said commutator section and where said insulating material is disposed between and molded to said tubular part and said commutator section.

4. A method of manufacturing a commutator for a dynamoelectric machine, the steps comprising, providing an annular piece of electrically conductive material, extruding said annular piece of material into the shape of a tubular part and during said extrusion forming a plurality of radially outwardly extending ribs defining longitudinally extending slots that face the interior of said tubular part and also forming substantially simultaneously with said extrusion step a radially extending riser section, cutting a plurality of slots in said riser section which are aligned said longitudinally extending slots and to such a depth as to join said longitudinally extending slots, molding a quantity of insulating material to the interior of said tubular part by applying a quantity of insulating material to the interior of said tubular part and filling said longitudinally extending slots and said slots cut in said riser section with said insulating material, and then machining away said radially outwardly directed ribs to form commutator sections joined to said riser sections which are insulated from each other by said insulating material.

5. A method of manufacturing a commutator for a dynamoelectric machine, the steps comprising, providing a piece of electrically conductive material, extruding said piece of material into the shape of a first tubular part and during said extrusion forming a plurality of radially outwardly extending ribs defining longitudinally extending slots that face the interior of said tubular part and also forming substantially simultaneously with said extrusion step a radially extending riser section, cutting a plurality of slots in said riser section which are aligned with said longitudinally extending slots and to such a depth as to join said longitudinally extending slots, positioning a second tubular part of smaller diameter than said first tubular part within said first tubular part, molding a quantity of insulating material to said tubular parts by applying a quantity of insulating material to the space between said tubular parts by filling said space, said longitudinally extending slots and said slots cut in said riser section with said insulating material, and then machining away said radially outwardly directed ribs to form commutator sections joined to said riser sections which are insulated from each other by said insulating material.

References Cited

UNITED STATES PATENTS

| | | | |
|---|---|---|---|
| 1,622,179 | 3/1927 | Carter | 29—597 |
| 3,177,562 | 4/1965 | Worner et al. | 29—597 |
| 3,251,120 | 5/1966 | Reisnecker | 29—597 |

FOREIGN PATENTS 777,025  6/1957  Great Britain.

JOHN F. CAMPBELL, *Primary Examiner.*

C. E. HALL, *Assistant Examiner.*